United States Patent
Seibert

(10) Patent No.: US 8,436,773 B2
(45) Date of Patent: May 7, 2013

(54) METHOD FOR LEVERAGING DIVERSITY FOR ENHANCED LOCATION DETERMINATION

(75) Inventor: Cristina A. Seibert, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 11/120,740

(22) Filed: May 2, 2005

(65) Prior Publication Data

US 2006/0232473 A1 Oct. 19, 2006

Related U.S. Application Data

(60) Provisional application No. 60/594,565, filed on Apr. 19, 2005.

(51) Int. Cl.
*G01S 3/02* (2006.01)

(52) U.S. Cl.
USPC .......................................................... 342/464

(58) Field of Classification Search .................. 342/464, 342/450–451, 385–387, 357.01–357.17, 342/359, 357.61
See application file for complete search history.

(56) References Cited

U.S. PATENT DOCUMENTS

| | | | |
|---|---|---|---|
| 5,758,288 A * | 5/1998 | Dunn et al. ................. | 455/456.5 |
| 6,052,561 A * | 4/2000 | Rudowicz et al. ........... | 455/13.1 |
| 6,084,547 A | 7/2000 | Sanderford et al. | |
| 6,370,397 B1 | 4/2002 | Popovic et al. | |
| 6,560,536 B1 * | 5/2003 | Sullivan et al. ............... | 701/214 |
| 6,731,622 B1 | 5/2004 | Frank et al. | |
| 6,975,266 B2 * | 12/2005 | Abraham et al. ......... | 342/357.02 |
| 7,095,368 B1 * | 8/2006 | van Diggelen ........... | 342/357.01 |
| 7,453,961 B1 * | 11/2008 | Li et al. ........................ | 375/343 |
| 2002/0118723 A1 | 8/2002 | McCrady et al. | |
| 2002/0171586 A1 * | 11/2002 | Martorana et al. ............ | 342/458 |
| 2004/0203420 A1 | 10/2004 | Rick et al. | |
| 2005/0275588 A1 * | 12/2005 | Schiffmiller et al. ......... | 342/387 |
| 2006/0022873 A1 * | 2/2006 | Zimmerman ................. | 342/464 |
| 2006/0279461 A1 * | 12/2006 | Zimmerman et al. ........ | 342/387 |

FOREIGN PATENT DOCUMENTS

| | | |
|---|---|---|
| EP | 1195614 A | 4/2002 |
| EP | 1491911 A | 12/2004 |

OTHER PUBLICATIONS

Paramivir Bahl and Venkata N. Padmanabhan, "RADAR: An In-Building RF-Based User Location and Tracking System", IEEE, 2000, pp. 775-784.*

McCrady et al., "Mobile Ranging Using Low-Accuracy Clocks", IEEE Transactions on Microwave Theory and Techniques, Jun. 2000, vol. 48, No. 6, pp. 952-954, IEEE Service Center, Piscataway, NJ, US.

(Continued)

*Primary Examiner* — Jack W Keith
*Assistant Examiner* — Nga X Nguyen
(74) *Attorney, Agent, or Firm* — Howard Seo

(57) ABSTRACT

A method for enhanced location determination using temporal, spatial and/or frequency diversity. Multiple ranging signal measurements are obtained from each signal source using either temporal, spatial and/or frequency diversity. In one embodiment, the multiple ranging signal measurements are combined using a metric to obtain a single ranging signal measurement. The location determination solution is then calculated using the single ranging signal measurement. In a second embodiment, a location determination solution is calculated for each of the multiple ranging signal measurements to result in multiple location determination solutions. A metric is then used to combine the multiple location determination solutions to result in a single location determination solution.

16 Claims, 13 Drawing Sheets

OTHER PUBLICATIONS

International Search Report—PCT/US2006/014880—International Search Authority—Nov. 27, 2006 (2 pages).

Written Opinion—PCT/US2006/014880, International Search Authority—European Patent Office—Nov. 27, 2006.

* cited by examiner

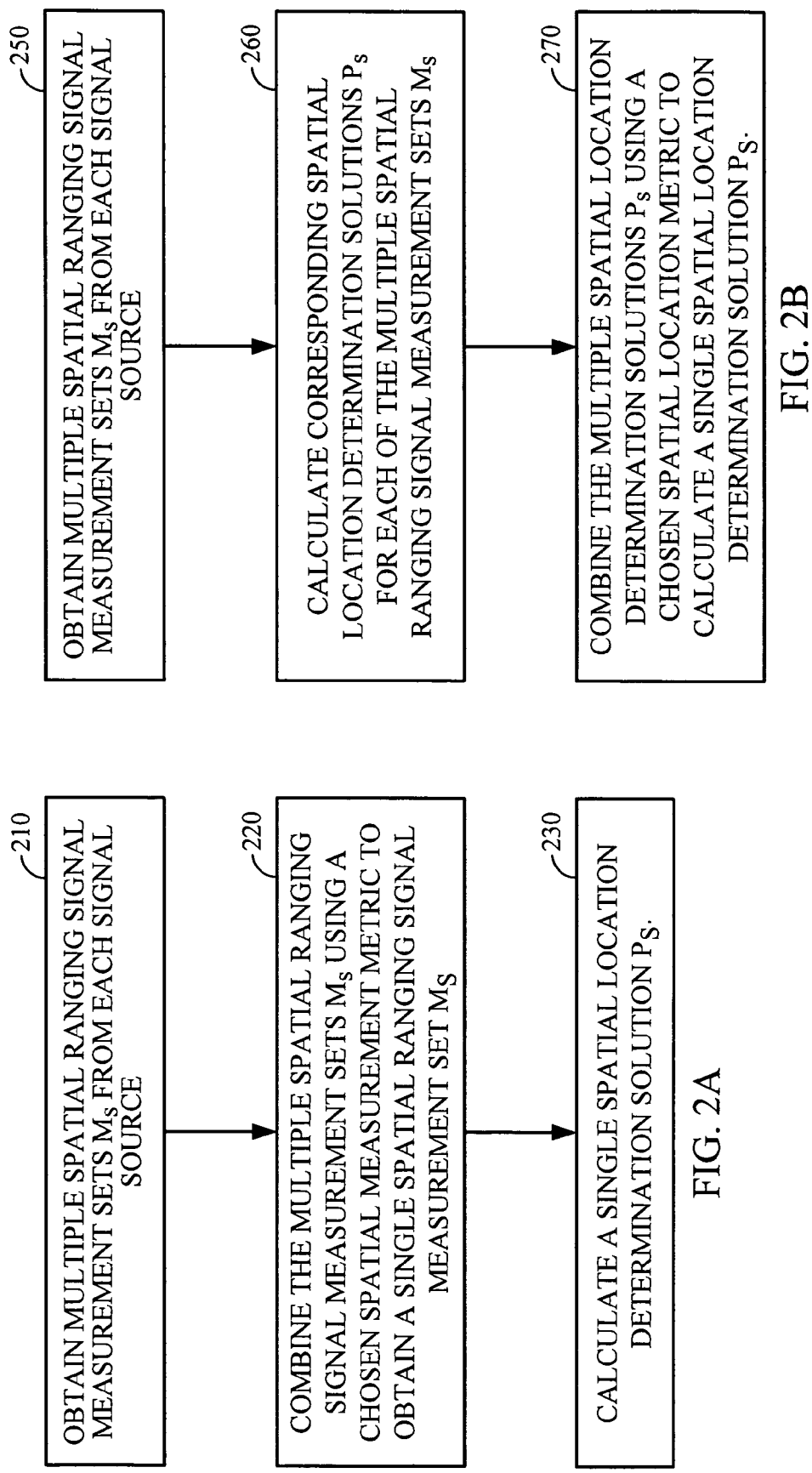

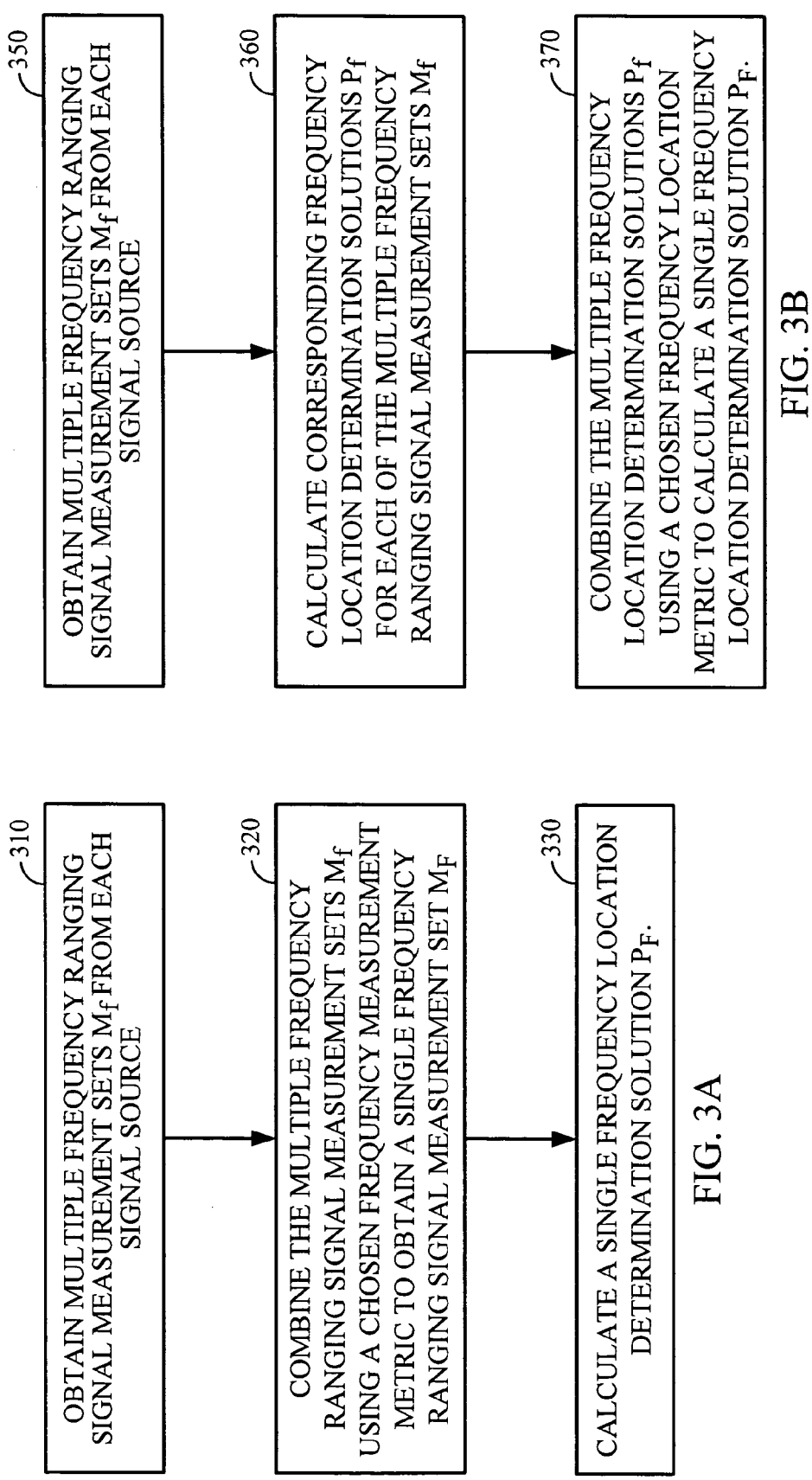

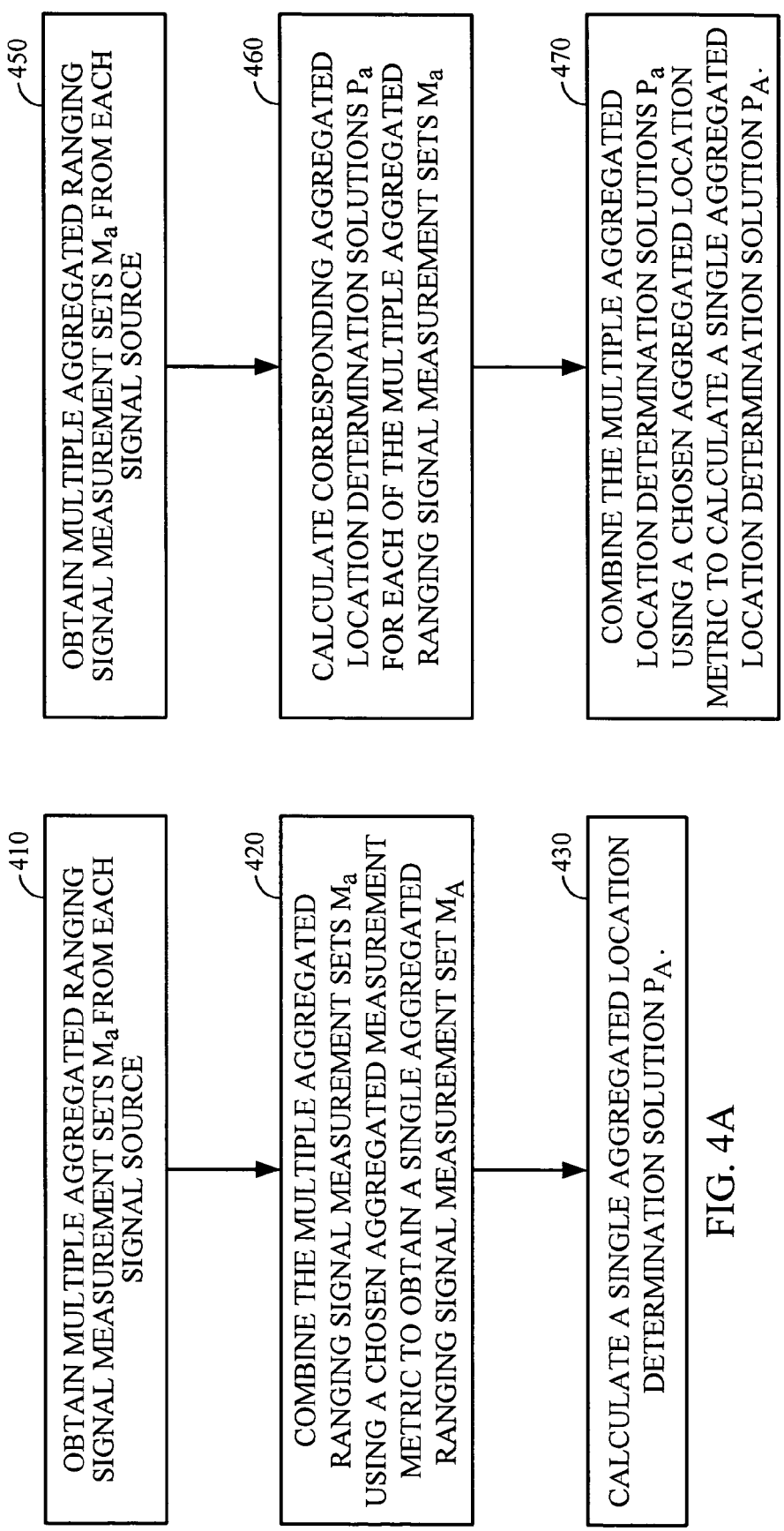

METHOD FOR LEVERAGING DIVERSITY FOR ENHANCED LOCATION DETERMINATION

RELATED APPLICATIONS

This application claims priority to U.S. Provisional Application No. 60/594,565, filed on Apr. 19, 2005.

FIELD

This invention relates generally to methods for location determination.

BACKGROUND

In range-based location determination systems, time delay measurements of ranging signals from a plurality of sources are converted to range information associated with the source of each ranging signal. Ranges to different sources with known locations are combined to solve for the unknown user location via geometric techniques known, for example, as trilateration (a.k.a. triangulation). If the delay of ranging signals cannot be known reliably (e.g. in asynchronous systems where the user clock is not synchronized to the network), location determination algorithms may treat user clock temporal bias as another unknown, to be solved for by the trilateration process, using an additional ranging measurement.

In location determination systems, measured user distances to a plurality of sources with known locations are combined to solve for the unknown user location via geometric techniques, for example: advanced forward link trilateration (AFLT). AFLT typically requires that the number of measurements available be at least equal to the number of unknown coordinates in the system, including the mobile spatial coordinates and time bias. Additionally, several independent ranging signal measurements from a given terrestrial source may be available. As another example of this technique, multiple ranging signals from orbiting navigation satellites, such as GPS, GLONASS, and Galileo, may be used for location determination of a mobile user.

In previous location determination schemes, the ranging signal set is a selection of single ranging signal measurements from each source that are deemed most accurate via a predetermined threshold. Such schemes yield a single location determination solution from the ranging signal set of a single ranging signal measurement per source.

Using a single ranging signal measurement per source may result in degraded accuracy in location determination since the quality of the ranging signal measurements may have been corrupted by the presence of multipath interference (superposition of multiple versions of the same ranging signal received from different paths), fading (due to propagation path impairments) or other channel impairments (such as intermittent interference or random noise). Using multiple ranging signal measurements per source may improve the accuracy of the location determination solution. Multiple ranging signal measurements per source can be derived by measuring ranging signals from each source over different time intervals (i.e., temporal diversity), over different spatial offsets (i.e., spatial diversity) and/or over different frequencies (i.e., frequency diversity).

Accordingly, it is desirable to provide a method using temporal, spatial and/or frequency diversity for enhanced location determination to improve accuracy.

SUMMARY

Disclosed is a method for enhanced location determination to improve accuracy using temporal, spatial and/or frequency diversity.

According to one aspect, a method for location determination using a plurality of signal sources includes obtaining temporal ranging signal measurement sets from each signal source. And the temporal ranging signal measurement sets are combined to obtain a single temporal ranging signal measurement set using a temporal measurement metric. A single temporal location determination solution is calculated from the single temporal ranging signal measurement set. In one embodiment, the temporal measurement metric is the selection of a path with the smallest time of arrival that is not a false path or a sidelobe.

According to another aspect, a method for location determination using a plurality of signal sources includes obtaining temporal ranging signal measurement sets from each signal source. Temporal location determination solutions are calculated from the temporal ranging signal measurement sets. And the temporal location determination solutions are combined to obtain a single temporal location determination solution using a temporal location metric.

According to another aspect, a method for location determination using a plurality of signal sources includes obtaining spatial ranging signal measurement sets from each signal source. The spatial ranging signal measurement sets are combined to obtain a single spatial ranging signal measurement set using a spatial measurement metric. And single spatial location determination solution is calculated from the single spatial ranging signal measurement set. In one embodiment, the spatial measurement metric is the selection of a path with the smallest time of arrival that is not a false path or a sidelobe.

According to another aspect, a method for location determination using a plurality of signal sources includes obtaining spatial ranging signal measurement sets from each signal source. Spatial location determination solutions are calculated from the spatial ranging signal measurement sets. And the spatial location determination solutions are combined to obtain a single spatial location determination solution using a spatial location metric.

According to another aspect, a method for location determination using a plurality of signal sources includes obtaining frequency ranging signal measurement sets from each signal source. The plurality of frequency ranging signal measurement sets are combined to obtain a single frequency ranging signal measurement set using a frequency measurement metric. And a single frequency location determination solution is calculated from the single frequency ranging signal measurement set. In one embodiment, the frequency measurement metric is the selection of a path with the smallest time of arrival that is not a false path or a sidelobe.

According to another aspect, a method for location determination using a plurality of signal sources includes obtaining frequency ranging signal measurement sets from each signal source. Frequency location determination solutions are calculated from the frequency ranging signal measurement sets. And the frequency location determination solutions are combined to obtain a single frequency location determination solution using a frequency location metric.

According to one aspect, a method for location determination using a plurality of signal sources includes obtaining aggregated ranging signal measurement sets from each signal source. The aggregated ranging signal measurement sets are combined to obtain a single aggregated ranging signal measurement set using a aggregated measurement metric. And a single aggregated location determination solution is calculated from the single aggregated ranging signal measurement set. In one embodiment, the aggregated measurement metric is the selection of a path with the smallest time of arrival that is not a false path or a sidelobe.

According to yet another aspect, a method for location determination using a plurality of signal sources includes obtaining aggregated ranging signal measurement sets from each signal source. Aggregated location determination solutions are calculated from the aggregated ranging signal measurement sets. And the aggregated location determination solutions are combined to obtain a single aggregated location determination solution using a aggregated location metric.

It is understood that other embodiments will become readily apparent to those skilled in the art from the following detailed description, wherein it is shown and described various embodiments by way of illustration. The drawings and detailed description are to be regarded as illustrative in nature and not as restrictive.

BRIEF DESCRIPTION OF THE DRAWINGS

FIGS. 2a and 2b are flow diagrams of algorithms for location determination using spatial diversity to improve accuracy, employing measurement combining and position combining, respectively.

FIGS. 3a and 3b are flow diagrams of algorithms for location determination using frequency diversity to improve accuracy, employing measurement combining and position combining, respectively.

FIGS. 4a and 4b are flow diagrams of algorithms for location determination using aggregated temporal, spatial and/or frequency diversity to improve accuracy, employing measurement combining and position combining, respectively.

In FIG. 8, measurement combining is used.

In FIG. 9, measurement combining is used.

In FIG. 10, measurement combining is used.

FIG. 13b is a "zoomed-out" version of FIG. 13a.

FIG. 14b is a "zoomed-out" version of FIG. 14a.

DETAILED DESCRIPTION

Figures 1A, 1B:
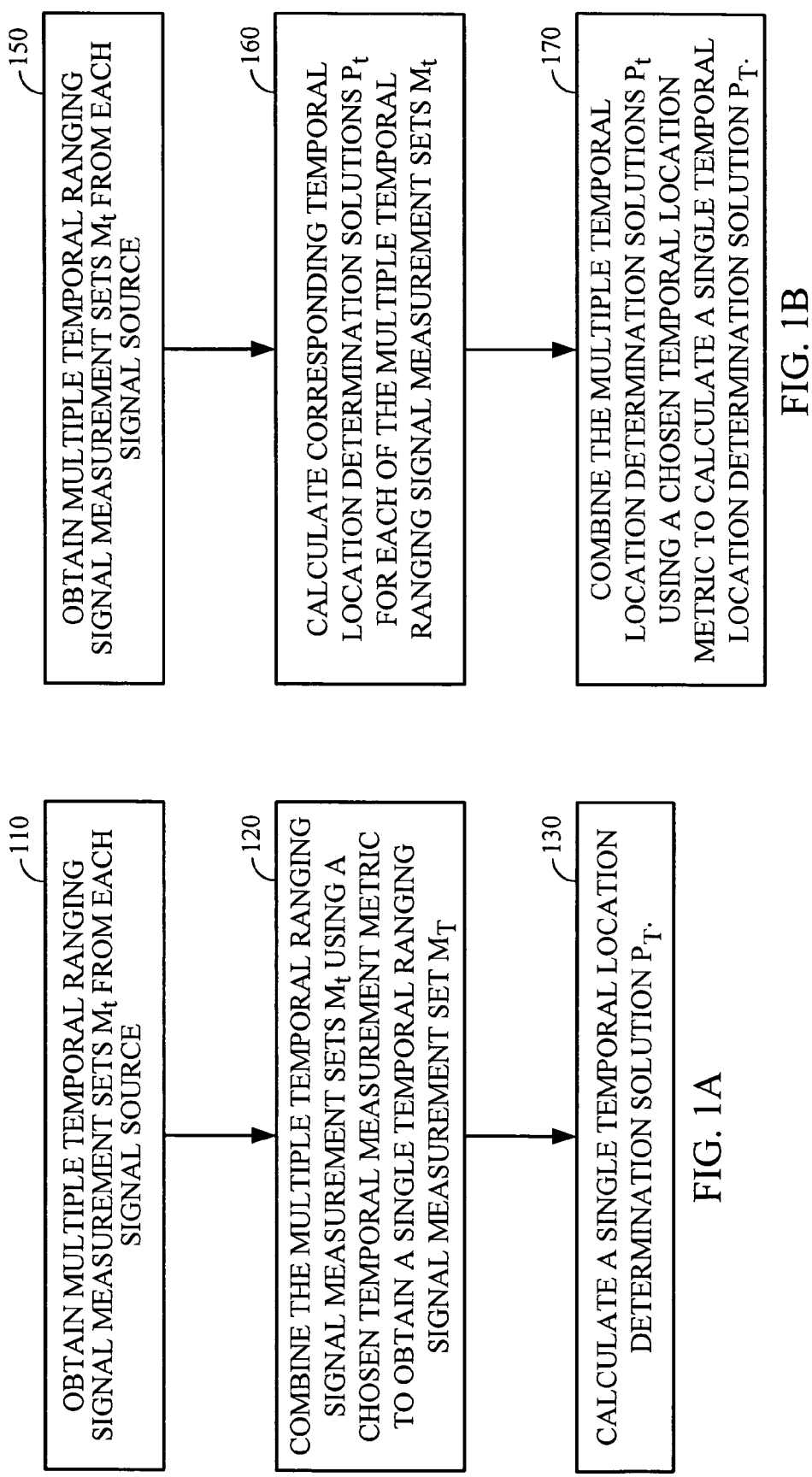
FIGS. 1a and 1b are flow diagrams of algorithms for location determination using temporal diversity to improve accuracy, employing measurement combining and position combining, respectively.

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention.

A method for enhanced location determination with improved accuracy using temporal, spatial and/or frequency diversity of ranging signal measurements employs multiple ranging signal measurement sets which are gathered for each signal source at different time intervals (i.e., temporal diversity), at different antenna locations (i.e., spatial diversity) and/or at different frequencies (i.e., frequency diversity) resulting in multiple independent measurements per source. The selected measurement set (i.e., single temporal ranging signal measurement set $M_T$, single spatial ranging signal measurement set $M_S$, single frequency ranging signal measurement set $M_F$ or single aggregate ranging signal measurement set $M_A$) from each source represents the path with the smallest time of arrival that is not a false path or a sidelobe. Then, the measurement set consists of one selected measurement per source In one embodiment, using temporal diversity only, the multiple temporal ranging signal measurement sets $M_t$ may be combined intelligently using metrics known to one skilled in the art to result in a single temporal ranging signal measurement set $M_T$ for location determination.

In another embodiment, each set of the multiple temporal ranging signal measurement sets $M_t$ is used to determine corresponding temporal location determination solutions $P_t$. The set of temporal location determination solutions $P_1$ are then intelligently combined using metrics known to one skilled in the art to result in a single temporal location determination solution $P_T$ using temporal diversity.

Using spatial diversity only, in one embodiment, the multiple spatial ranging signal measurement sets $M_s$ may be combined intelligently using metrics known to one skilled in the art to result in a single spatial ranging signal measurement set $M_S$ for location determination.

In another embodiment, each set of the multiple spatial ranging signal measurement sets $M_s$ is used to determine corresponding spatial location determination solutions $P_s$. The set of spatial location determination solutions $P_s$ are then intelligently combined using metrics known to one skilled in the art to result in a single spatial location determination solution $P_S$ using spatial diversity.

Using frequency diversity only, in one embodiment, the multiple frequency ranging signal measurement sets $M_f$ may be combined intelligently using metrics known to one skilled in the art to result in a single frequency ranging signal measurement set $M_F$ for location determination.

In another embodiment, each set of the multiple frequency ranging signal measurement sets $M_f$ is used to determine corresponding frequency location determination solutions $P_f$. The set of frequency location determination solutions $P_f$ are then intelligently combined using metrics known to one skilled in the art to result in a single frequency location determination solution $P_F$ using frequency diversity.

Using aggregated temporal, spatial and/or frequency diversity, in one embodiment, the multiple aggregated ranging signal measurement sets $M_a$ may be combined intelligently using metrics known to one skilled in the art to result in a single aggregated ranging signal measurement set $M_A$ for location determination. In another embodiment, each set of the multiple aggregated ranging signal measurement sets $M_a$ is used to determine corresponding aggregated location determination solutions $P_a$. The set of aggregated location determination solutions $P_a$ are then intelligently combined using metrics known to one skilled in the art to result in a single aggregated location determination solution $P_A$ using aggregated temporal and spatial diversity.

FIGS. 1a, 2a, 3a and 4a illustrate measurement combining techniques in which measurement sets from multiple sources are combined to obtain a single measurement set for obtaining a location determination solution. FIGS. 1b, 2b, 3b and 4b illustrate position combining techniques in which an "interim" location determination solution, is calculated for each measurement set. From the multiple measurements per source, multiple "interim" location determination solutions are generated which are then combined to determine a location determination solution. FIGS. 1a and 1b are flow diagrams of algorithms for location determination using temporal diversity to improve accuracy. In FIG. 1a, the multiple temporal ranging signal measurement sets $M_t$ are combined using a temporal measurement metric known to one skilled in the art to result in a single temporal ranging signal measurement set $M_T$ for determining a single temporal location determination solution $P_T$. In step 110, obtain multiple temporal ranging signal measurement sets $M_t$ from each signal source. In step 120, combine the multiple temporal ranging signal measurement sets $M_t$ using a chosen temporal measurement metric to obtain a single temporal ranging signal measurement set $M_T$. In one embodiment, the temporal measurement metric is the root mean square (RMS) of the multiple temporal ranging signal measurement sets $M_t$. In another embodiment, the temporal measurement metric is the normalized root mean square (NRMS) of the multiple temporal ranging signal measurement sets $M_t$. In step 130, a single temporal location determination solution $P_T$ is derived using known triangulation techniques.

In FIG. 1b, each set of the multiple temporal ranging signal measurement sets $M_t$ is used to determine corresponding temporal location determination solutions $P_t$. The set of temporal location determination solutions $P_t$ are then combined using a temporal location metric known to one skilled in the art to result in a single temporal location determination solution $P_T$. In step 150, obtain multiple temporal ranging signal measurement sets $M_t$ from each signal source. In step 160, calculate corresponding temporal location determination solutions $P_t$ for each of the multiple temporal ranging signal measurement sets $M_t$. In step 170, combine the multiple temporal location determination solutions $P_t$ using a chosen temporal location metric to calculate a single temporal location determination solution $P_T$. In one embodiment, the temporal location metric is the root mean square (RMS) of the multiple temporal location determination solutions $P_t$.

In another embodiment, the temporal location metric is the normalized root mean square (NRMS) of the multiple temporal location determination solutions $P_t$.

FIGS. 2a and 2b are flow diagrams of algorithms for location determination using spatial diversity to improve accuracy. In FIG. 2a, the multiple spatial ranging signal measurement sets $M_s$ are combined using a spatial measurement metric known to one skilled in the art to result in a single spatial ranging signal measurement set $M_S$ for determining a single spatial location determination solution $P_S$. In step 210, obtain multiple spatial ranging signal measurement sets $M_s$ from each signal source. In step 220, combine the multiple spatial ranging signal measurement sets $M_s$ using a chosen spatial measurement metric to obtain a single spatial ranging signal measurement set $M_S$. In one embodiment, the spatial measurement metric is the root mean square (RMS) of the multiple spatial ranging signal measurement sets $M_s$. In another embodiment, the spatial measurement metric is the normalized root mean square (NRMS) of the multiple spatial ranging signal measurement sets $M_s$. In step 230, a single spatial location determination solution $P_S$ is derived using known triangulation techniques.

In FIG. 2b, each set of the multiple spatial ranging signal measurement sets $M_s$ is used to determine corresponding spatial location determination solutions $P_s$. The set of spatial location determination solutions $P_s$ are then combined using a spatial location metric known to one skilled in the art to result in a single spatial location determination solution $P_S$. In step 250, obtain multiple spatial ranging signal measurement sets Ms from each signal source. In step 260, calculate corresponding spatial location determination solutions $P_s$ for each of the multiple spatial ranging signal measurement sets $M_s$. In step 270, combine the multiple spatial location determination solutions $P_s$ using a chosen spatial location metric to calculate a single spatial location determination solution $P_S$. In one embodiment, the spatial location metric is the root mean square (RMS) of the multiple spatial location determination solutions $P_s$. In another embodiment, the spatial location metric is the normalized root mean square (NRMS) of the multiple spatial location determination solutions $P_s$.

FIGS. 3a and 3b are flow diagrams of algorithms for location determination using frequency diversity to improve accuracy. In FIG. 3a, the multiple frequency ranging signal measurement sets $M_f$ are combined using a frequency measurement metric known to one skilled in the art to result in a single frequency ranging signal measurement set $M_F$ for determining a single frequency location determination solution $P_F$. In step 310, obtain multiple frequency ranging signal measurement sets $M_s$ from each signal source. In step 320, combine the multiple frequency ranging signal measurement sets $M_f$ using a chosen frequency measurement metric to obtain a single frequency ranging signal measurement set $M_F$.

In one embodiment, the frequency measurement metric is the root mean square (RMS) of the multiple frequency ranging signal measurement sets $M_f$. In another embodiment, the frequency measurement metric is the normalized root mean square (NRMS) of the multiple frequency ranging signal measurement sets $M_f$. In step 330, a single frequency location determination solution $P_F$ is derived using known triangulation techniques.

In FIG. 3b, each set of the multiple frequency ranging signal measurement sets $M_f$ is used to determine corresponding frequency location determination solutions $P_f$. The set of frequency location determination solutions $P_f$ are then combined using a frequency location metric known to one skilled in the art to result in a single frequency location determination solution $P_F$. In step 350, obtain multiple frequency ranging signal measurement sets $M_f$ from each signal source. In step 360, calculate corresponding frequency location determination solutions $P_f$ for each of the multiple frequency ranging signal measurement sets $M_f$. In step 370, combine the multiple frequency location determination solutions $P_f$ using a chosen frequency location metric to calculate a single frequency location determination solution $P_F$. In one embodiment, the frequency location metric is the root mean square (RMS) of the multiple frequency location determination solutions $P_f$. In another embodiment, the frequency location metric is the normalized root mean square (NRMS) of the multiple frequency location determination solutions $P_f$.

FIGS. 4a and 4b are flow diagrams of algorithms for location determination using aggregated temporal, spatial and/or frequency diversity to improve accuracy. One skilled in the art would know that any combination of temporal, spatial and/or frequency diversity could be used. In FIG. 4a, the multiple aggregated ranging signal measurement sets $M_a$ are combined using a aggregated measurement metric known to one skilled in the art to result in a single aggregated ranging signal measurement set $M_A$ for determining a single aggregated location determination solution $P_A$. In step 410, obtain multiple aggregated ranging signal measurement sets $M_a$ from each signal source. In step 420, combine the multiple aggregated ranging signal measurement sets $M_a$ using a chosen aggregated measurement metric to obtain a single aggregated ranging signal measurement set $M_A$.

In one embodiment, the aggregated measurement metric is the root mean square (RMS) of the multiple aggregated ranging signal measurement sets $M_a$. In another embodiment, the aggregated measurement metric is the normalized root mean square (NRMS) of the multiple aggregated ranging signal measurement sets $M_a$. In step 430, a single aggregated location determination solution $P_A$ is derived using known triangulation techniques.

In FIG. 4b, each set of the multiple aggregated ranging signal measurement sets $M_a$ is used to determine corresponding aggregated location determination solutions $P_a$. The set of aggregated location determination solutions $P_a$ are then combined using a aggregated location metric known to one skilled in the art to result in a single aggregated location determination solution $P_A$. In step 450, obtain multiple aggregated ranging signal measurement sets $M_a$ from each signal source. In step 460, calculate corresponding aggregated location determination solutions $P_a$ for each of the multiple aggregated ranging signal measurement sets $M_a$. In step 470, combine the multiple aggregated location determination solutions $P_a$ using a chosen aggregated location metric to calculate a single aggregated location determination solution $P_A$.

In one embodiment, the aggregated location metric is the root mean square (RMS) of the multiple aggregated location determination solutions $P_a$. In another embodiment, the aggregated location metric is the normalized root mean square (NRMS) of the multiple aggregated location determination solutions $P_a$.

Figure 5:
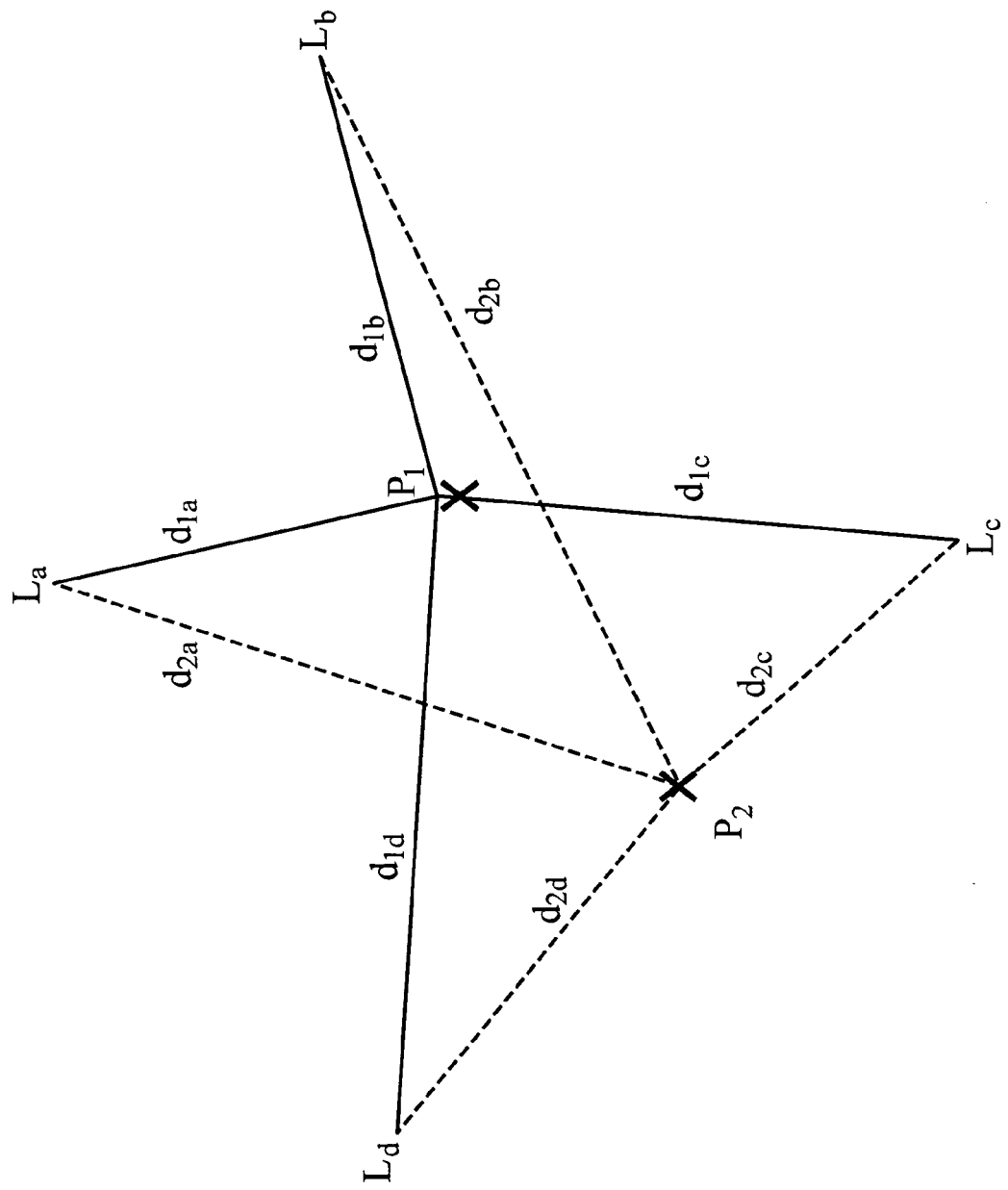
FIG. 5 graphically illustrates the application of the Root Mean Square (RMS) metric for selecting a location determination solution from a set of possible location determination solutions generated from multiple ranging signal sets to improve accuracy.

FIG. 5 graphically illustrates the application of the Root Mean Square (RMS) metric for selecting a final location determination solution from a set of multiple location determination solutions generated from multiple ranging signal measurement sets to improve accuracy consistent with the steps of FIGS. 1b, 2b, 3b and 4b. Residual error E of a ranging signal measurement is given by the difference between a) the Euclidean distance d between the location L of the ranging signal source and the computed location determination solution P, and b) the pilot phase F (converted to distance units) of that ranging signal measurement adjusted by the computed clock bias and other common errors.

In the example illustrated in FIG. 5, there are Q ranging signal sources (where Q=4) at locations $L_a$, $L_b$, $L_c$ and $L_d$. Assume that there are two possible computed location determination solutions $P_1$ and $P_2$. Define Euclidean distances between each of the 4 ranging signal sources at locations $L_a$, $L_b$, $L_c$ and $L_d$ and the first computed location determination solution $P_1$ as:

1.
$$d_{1a} = .|\vec{P_1}L_a|$$

2.
$$d_{1b} = .|\vec{P_1}L_b|$$

3.
$$d_{1c} = .|\vec{P_1}L_c|$$

4.
$$d_{1d} = .|\vec{P_1}L_d|$$

Define Euclidean distances between each of the 4 ranging signal sources at locations $L_a$, $L_b$, $L_c$, and $L_d$ and the second computed location determination solution $P_2$ as:

1.
$$d_{2a} = .|\vec{P_2}L_a|$$

2.
$$d_{2b} = .|\vec{P_2}L_b|$$

3.
$$d_{2c} = .|\vec{P_2}L_c|$$

4.
$$d_{2d} = .|\vec{P_2}L_d|$$

There are 4 pilot phases $F_{1a}$, $F_{1b}$, $F_{1c}$ and $F_{1d}$ (converted to distance units) associated with the first computed location determination solution $P_1$ and the 4 ranging signal sources at locations $L_a$, $L_b$, $L_c$ and $L_d$. The 4 raw residual errors ($E'_{1a}$, $E'_{1b}$, $E'_{1c}$, $E'_{1d}$) associated with the 4 ranging signal sources at locations $L_a$, $L_b$, $L_c$ and $L_d$ and the first computed location determination solution $P_1$ are defined as:

$E'_{1a} = d_{1a} - F_{1a}$
$E'_{1b} = d_{1b} - F_{1b}$
$E'_{1c} = d_{1c} - F_{1c}$
$E'_{1d} = d_{1d} - F_{1d}$

The 4 residual errors ($E'_{1a}$, $E'_{1b}$, $E'_{1c}$, $E'_{1d}$) are defined as:

$E_{1a} = E'_{1a} - \text{mean}(E'_{1a}, E'_{1b}, E'_{1c}, E'_{1d})$
$E_{1b} = E'_{1b} - \text{mean}(E'_{1a}, E'_{1b}, E'_{1c}, E'_{1d})$
$E_{1c} = E'_{1c} - \text{mean}(E'_{1a}, E'_{1b}, E'_{1c}, E'_{1d})$
$E_{1d} = E'_{1d} - \text{mean}(E'_{1a}, E'_{1b}, E'_{1c}, E'_{1d})$ Similarly, there are 4 pilot phases $F_{2a}$, $F_{2b}$, $F_{2c}$ and $F_{2d}$ (converted to distance units) associated with the second computed location determination solution $P_2$ and the 4 ranging signal sources at locations $L_a$, $L_b$, $L_c$ and $L_d$. The 4 raw residual errors ($E'_{2a}$, $E'_{2b}$, $E'_{2c}$, $E'_{2d}$) associated with the 4 ranging signal sources at locations $L_a$, $L_b$, $L_c$ and $L_d$ and the second computed location determination solution $P_2$ are defined as:

$E'_{2a} = d_{2a} - F_{2a}$
$E'_{2b} = d_{2b} - F_{2b}$
$E'_{2c} = d_{2c} - F_{2c}$
$E'_{2d} = d_{2d} - F_{2d}$

The 4 residual errors ($E_{2a}$, $E_{2b}$, $E_{2c}$, $E_{2d}$) are defined as:

$E_{2a} = E'_{2a} - \text{mean}(E'_{2a}, E'_{2b}, E'_{2c}, E'_{2d})$
$E_{2b} = E'_{2b} - \text{mean}(E'_{2a}, E'_{2b}, E'_{2c}, E'_{2d})$
$E_{2c} = E'_{2c} - \text{mean}(E'_{2a}, E'_{2b}, E'_{2c}, E'_{2d})$
$E_{2d} = E'_{2d} - \text{mean}(E'_{2a}, E'_{2b}, E'_{2c}, E'_{2d})$ The RMS values ($RMS_1$ and $RMS_2$) associated with the residual errors for each of the two location determination solutions in this example are:

$$RMS_1 = \sqrt{(E_{1a}^2 + E_{1b}^2 + E_{1c}^2 + E_{1d}^2)/Q}$$

$$RMS_2 = \sqrt{(E_{2a}^2 + E_{2b}^2 + E_{2c}^2 + E_{2d}^2)/Q}$$

where Q=4 in this example.

The final location determination solution is the location determination solution with the minimum RMS value among $RMS_1$ and $RMS_2$. One skilled in the art would know that each of the computed user locations may leverage different number of ranging signals (i.e., the Q value for $RMS_1$ and $RMS_2$ may be different).

For the purpose of illustration only, simulations using real user data are presented. The real user data (CDMA channel data) are collected from three indoor sites in the Bay Area in California. The CDMA channel data is then fed to the DIVA simulation, and corresponding location determination results are produced. The data consists of channel estimates from each of the two antennas in the phone, reported in an alternating fashion across time. Hence, both temporal and spatial diversity are leveraged for DIVA with N>1.

Figure 6:
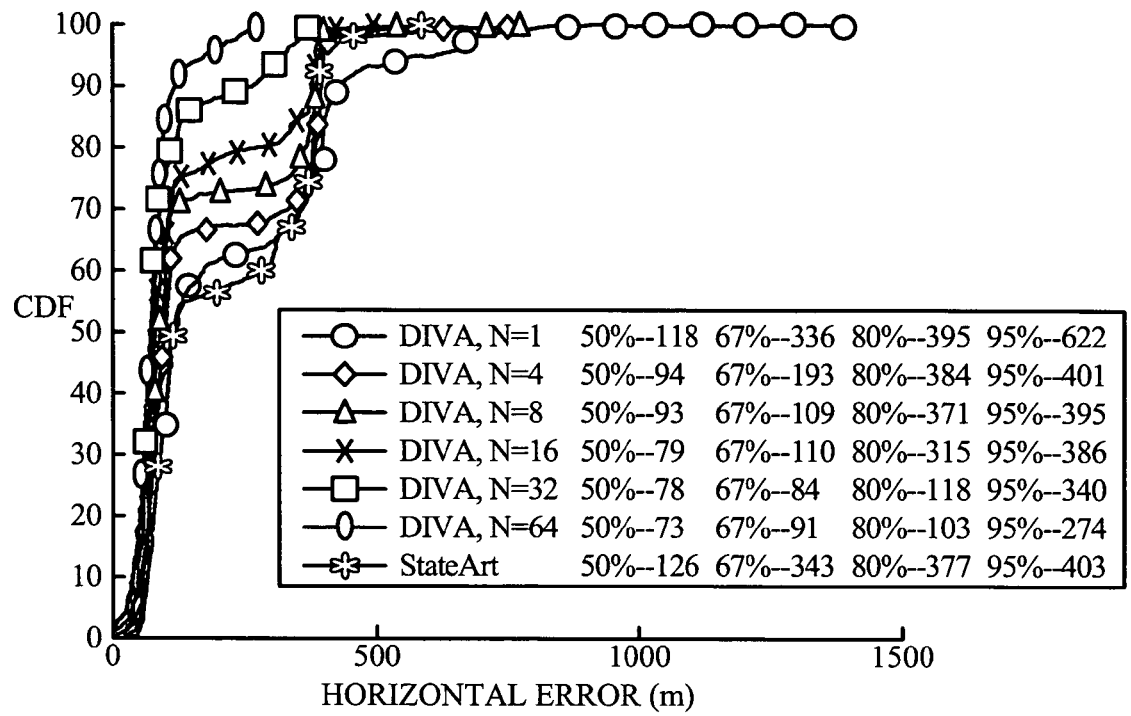
FIG. 6 is a graph of the Cumulative Distribution Function (CDF) of horizontal error comparing location determination accuracy for the diversity algorithm with measurement combining versus the state of the art.

FIG. 6 is a graph of the Cumulative Distribution Function (CDF) of horizontal error comparing location determination accuracy for the diversity algorithm (DIVA) versus the state of the art. FIG. 6 is an example of the "measurement combining" discussed in FIGS. 1a, 2a, 3a and 4a. DIVA aggregates ranging signal measurements over some large window of time N and optionally across multiple antennas. The unit of time, also referred to as a cluster, may represent the time to complete one search cycle (i.e., searching all the ranging signals available in a given environment) the time spent searching on one antenna, etc. The user receiver searches for ranging signal measurements, and reports some number D of the detected paths and their characteristics associated with each ranging signal measurement. A ranging signal measurement is said to be detected if the power level of the strongest path is above a chosen threshold. The ranging signal measurement may also be detected if its power level is above the noise threshold associated with the last stage in the search.

If the time of arrival of ranging signal measurements is used in the location determination algorithm, the path with the smallest time of the arrival (that is not a false path or a sidelobe) is chosen, since it is less likely to have incurred delay overhead due to multipath. Through DIVA, by inspecting a larger number of ranging signal samples (in time, space, frequency), there is an increase in the likelihood of capturing an earlier path (preferably the line-of-sight path to a signal source), hence increasing the quality of the ranging signal used for location determination. Also, since ranging signals generally fade in and out, they become more likely to be seen when a diverse plurality of samples (in time, space and frequency) gets inspected, hence more ranging signals become available for location determination.

Figure 7:
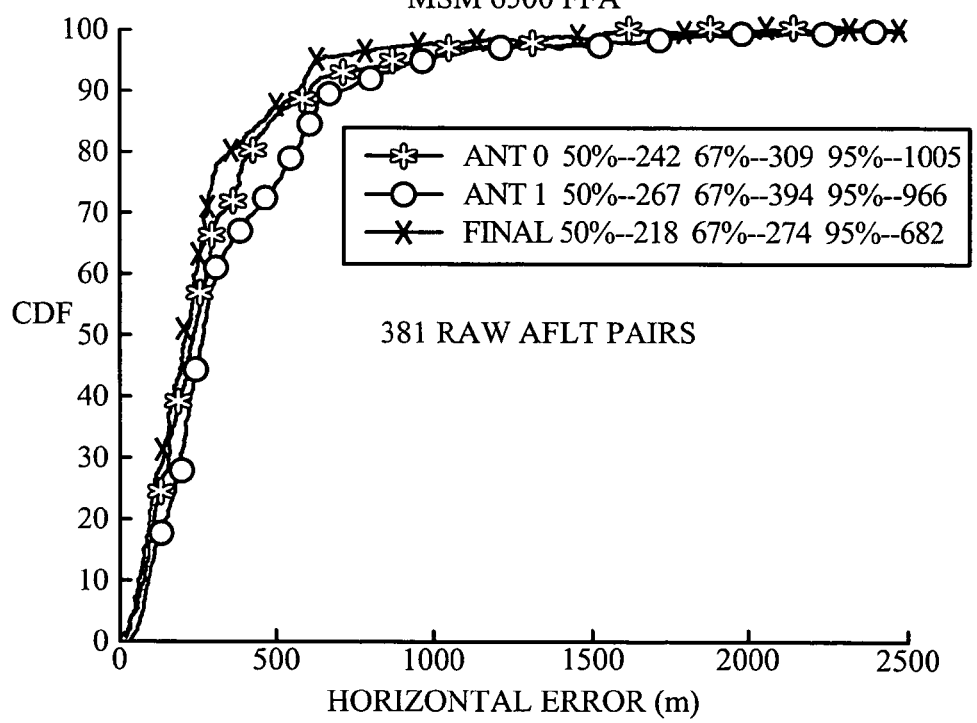
FIG. 7 is a graph of the Cumulative Distribution Function (CDF) of horizontal error comparing location determination accuracy with and without spatial diversity and position combining.

FIG. 7 is a graph of the Cumulative Distribution Function (CDF) of horizontal error comparing location determination accuracy with and without spatial diversity and position combining. FIG. 7 is an example of the "position combining" discussed in FIGS. 1b, 2b, 3b and 4b. In particular, FIG. 7 uses only spatial diversity using two different antennas. In this example, solutions within some time proximity from the two antennas are paired. The solutions in each pair are disambiguated using some metric. The disambiguation metric is the horizontal error precision estimate (HEPE).

As shown in FIG. 6, the diversity algorithm (as compared to the state of the art) improves the location determination accuracy at all percentiles, by as much as 75% at the 67th percentile. The improvement can be attributed to an increase in the number of ranging signal measurements that were used in location determination (from ~4 pilots for the state of the art to ~6 pilots for the diversity algorithm with N=64). The improvement can also be attributed to the quality of the ranging signal measurements. The overhead in the time of arrival of used ranging signal measurements decreases from a mean of ~150 m to ~120 m, while the associated spread decreases from ~170 m to ~100 m. Also, as shown in FIG. 7, with spatial diversity and position combining, the CDF of the horizontal error improves by as much as 30-40% in the 95th percentile.

Figure 8:
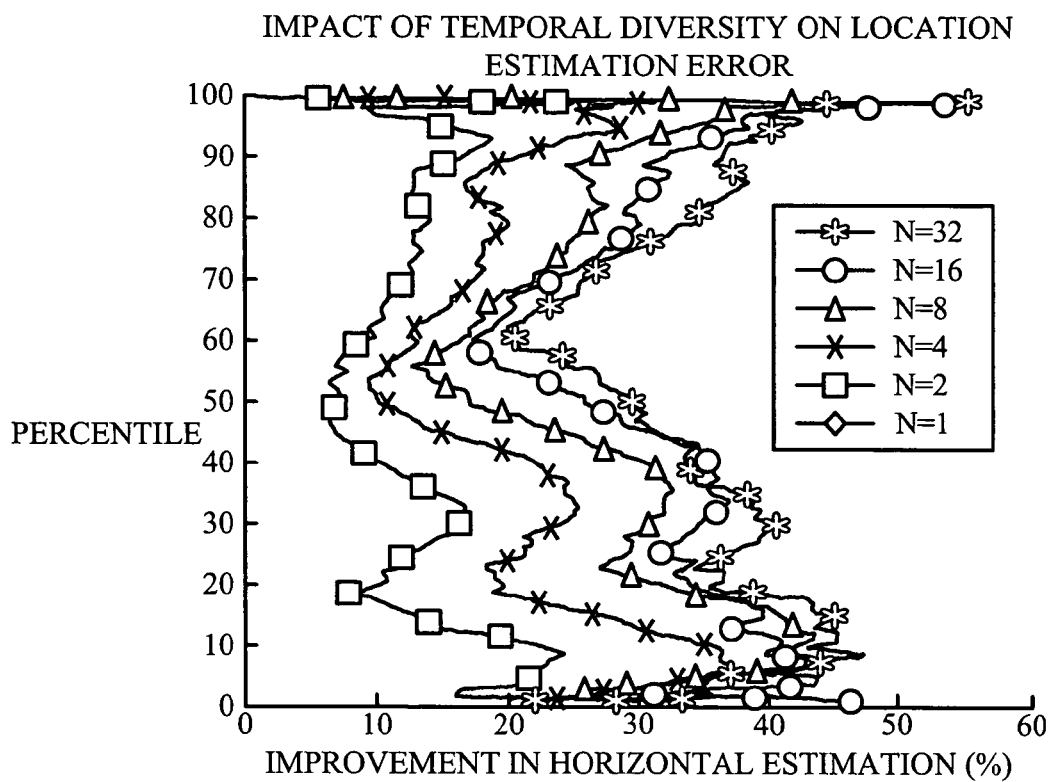
FIG. 8 is a graph of the Cumulative Distribution Function (CDF) percentile versus improvement in horizontal error (%) due to the impact of temporal diversity on location determination error.

In a simulation experiment using actual channel measurements, about two hours of CDMA channel data is collected from eight geographically distinct indoor sites in the Bay Area (California) using a Qualcomm MSM 6500 single-antenna phone. The channel data is then fed to the DIVA simulation with measurement combining, and corresponding location determination results are produced. The channel estimates are gathered from a single antenna only. Thus, only temporal diversity is leveraged with N>1. The results are shown FIG. 8. Location determination accuracy (with respect to ground truth) with N=1 is used as a baseline, and the relative improvement in location determination accuracy is depicted for each increasing N.

Figure 9:
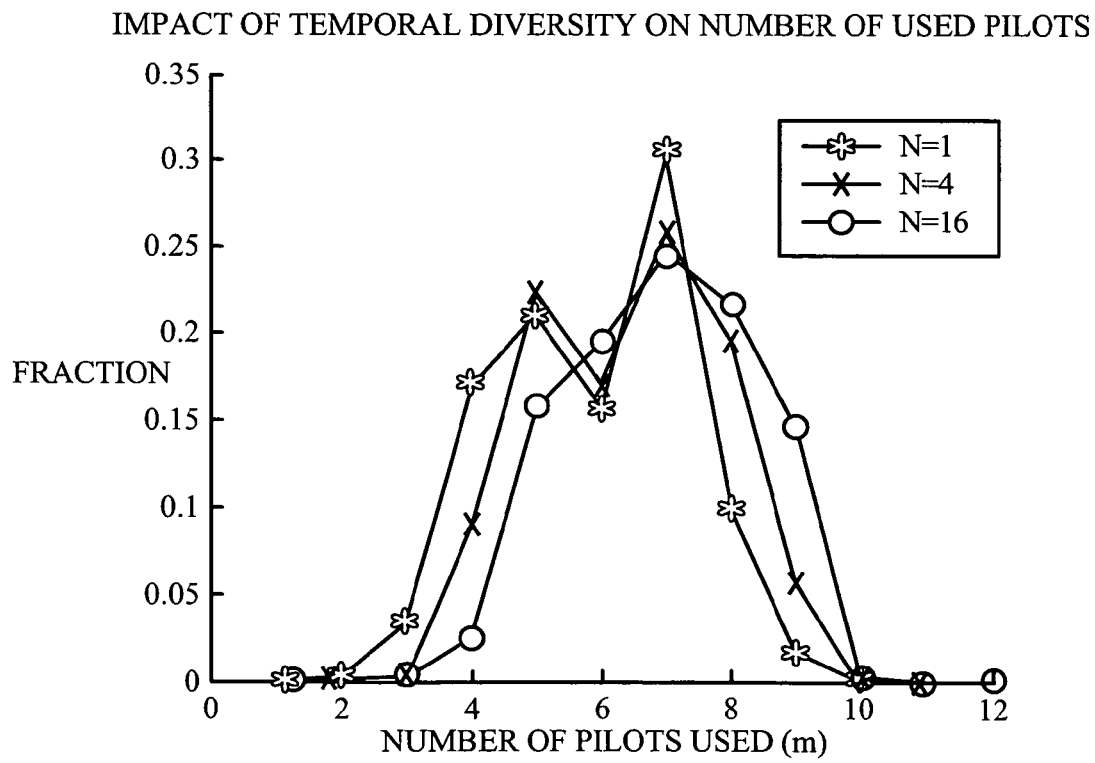
FIG. 9 is a graph of the fraction of total available ranging signals versus number of used ranging signals ("pilots") due to the impact of temporal diversity on the number of ranging signals used.
Figure 10:
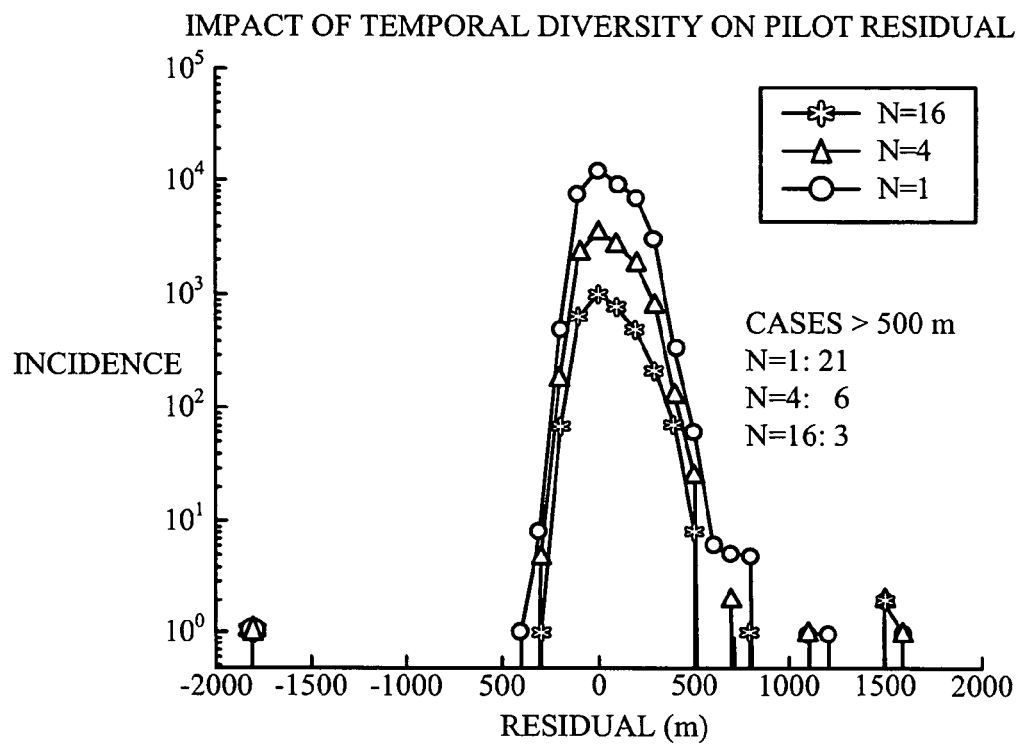
FIG. 10 is a graph of the number of incidence versus the ranging signal residual horizontal errors due to the impact of temporal diversity on ranging signal residual horizontal errors.

The improvement in location accuracy can be attributed to an increase in the number of signals that can be used for location determination, as well as an improvement in the quality of signal measurement. FIG. 9 shows that with increasing N, the number of ranging signals ("pilots") available for location determination increases monotonically. Similarly, FIG. 10 demonstrates that outlier ranging signals ("outlier pilots") with poor quality as measured by a high residual horizontal error value can be reduced, in this case from about 21 cases for N=1 to 3 cases for N=16, an improvement of 85%.

In an experiment, a prototype of DIVA with measurement combining and temporal diversity is built on top of the location determination software from a state-of-the-art phone with location determination capability. The state-of-the-art phone only keeps the results from the five (5) most recent channel searches in order to estimate location. However, for this experiment, the parameter value was extended to 16. Also, the phone discards a signal from its database of signals to be used for location computation if the signal had not been seen during any of the last three (3) searches. For the experiment, this parameter was also extended to 16. Other algorithmic features were left unmodified. Note that some algorithms in the phone implementation, such as signal aging can lead to signals being discarded that would otherwise be used in a DIVA implementation built from scratch.

Figure 11:
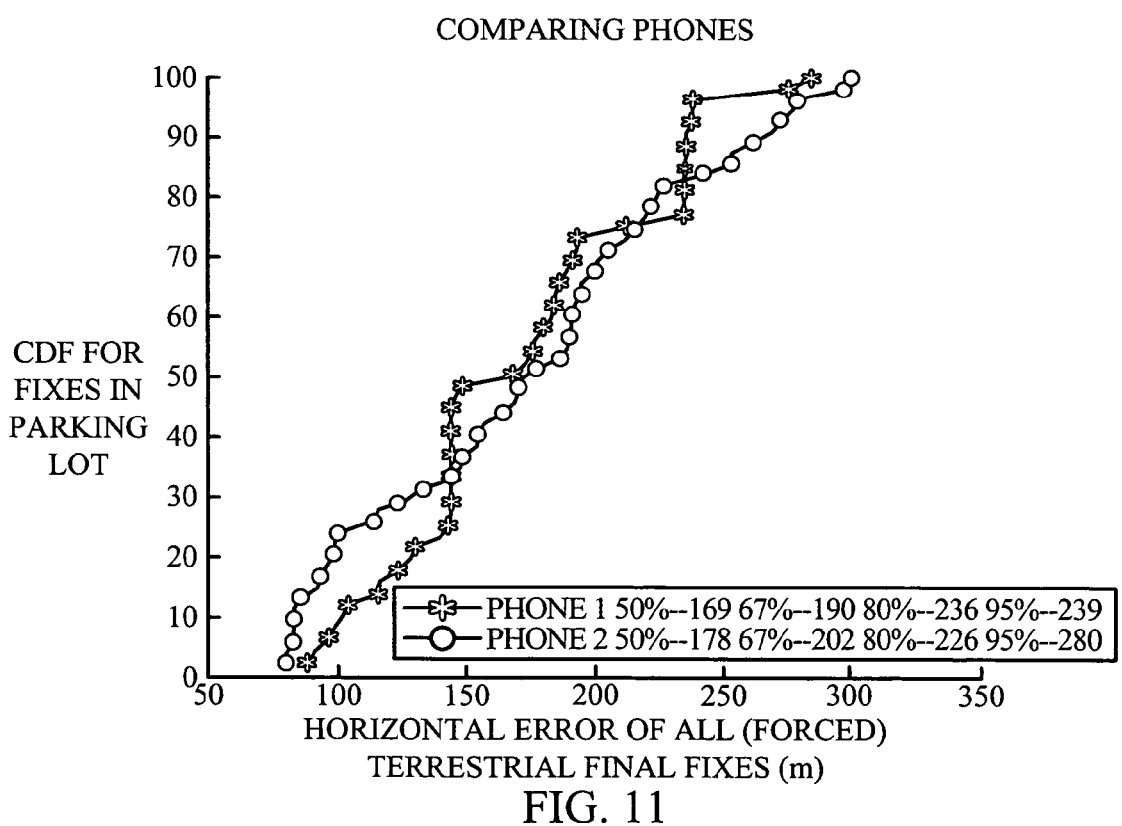
FIG. 11 is a graph of the Cumulative Distribution Function (CDF) of horizontal error for location determination solutions ("fixes") in a parking lot versus the horizontal error of all the terrestrial location determination solutions ("fixes") for two phones.

In the experiment, two phones were used. Comparison was made of the prototype to the state-of-the-art using side-by-side live testing. The Phone Equivalence Testing included ensuring that the two phone hardware produce equivalent results when imaged with the same software version, as shown in FIG. 11. Next, a 20-mile drive test in the San Francisco Bay Area (California) was done with location determination solutions ("fixes") collected for both phones in the following way:

1. Start driving
2. Stop at outdoor site 1
3. Place 5 minute of location determination solutions ("fixes") simultaneously with both phones
4. Switch place of phones
5. Place another 5 minutes of location determination solutions ("fixes") simultaneously with both phones
6. Repeat steps 3-7 T more times (here, T=15)
7. Analyze and compare the accuracy of the forced terrestrial final location determination solutions ("fixes") with respect to truth for the two phones. Truth is set from the output of a GPS engine with uncertainty of less than 20 meters.

Figure 12:
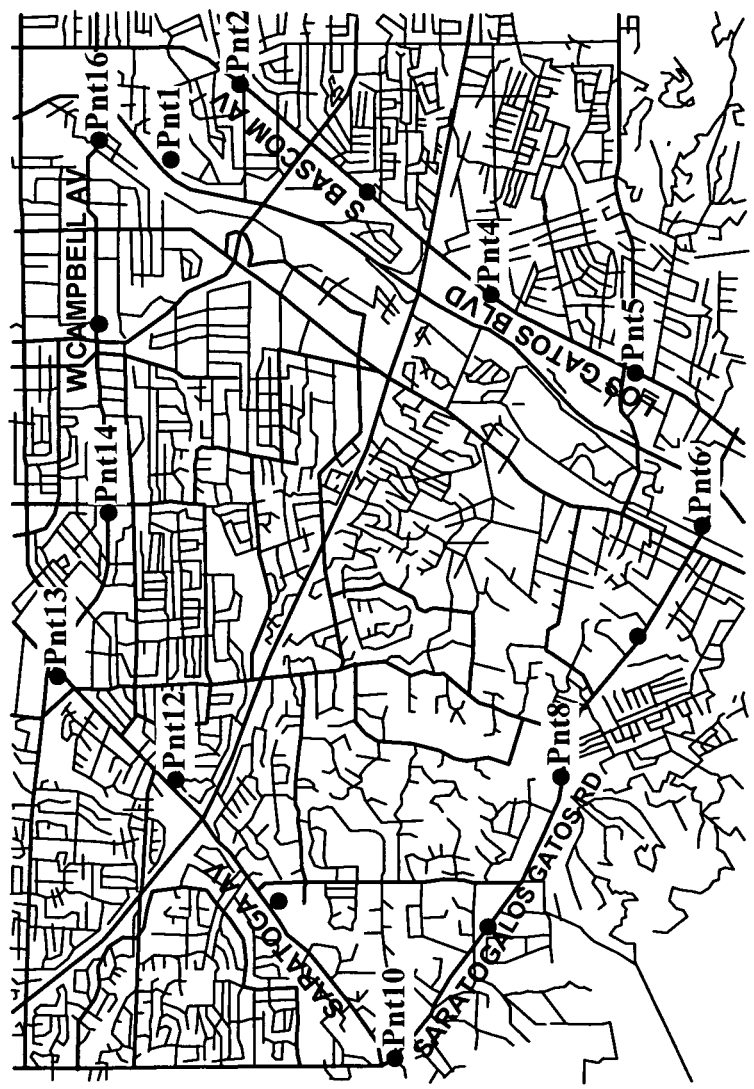
FIG. 12 is a map of the geographical area covered by a drive test in the San Francisco Bay Area (California).
Figure 13A:
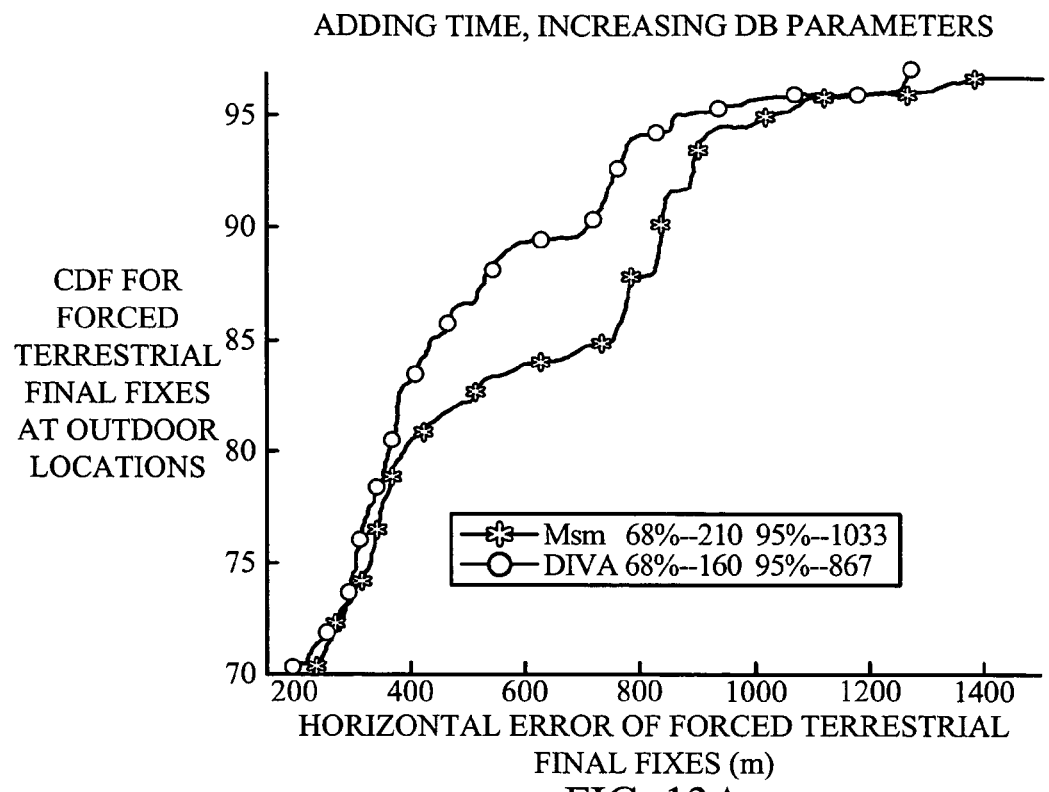
FIG. 13a a graph of the partial Cumulative Distribution Function (CDF) for forced terrestrial final location determination solutions ("fixes") at outdoor locations (using two phones) versus horizontal error.
Figure 13B:
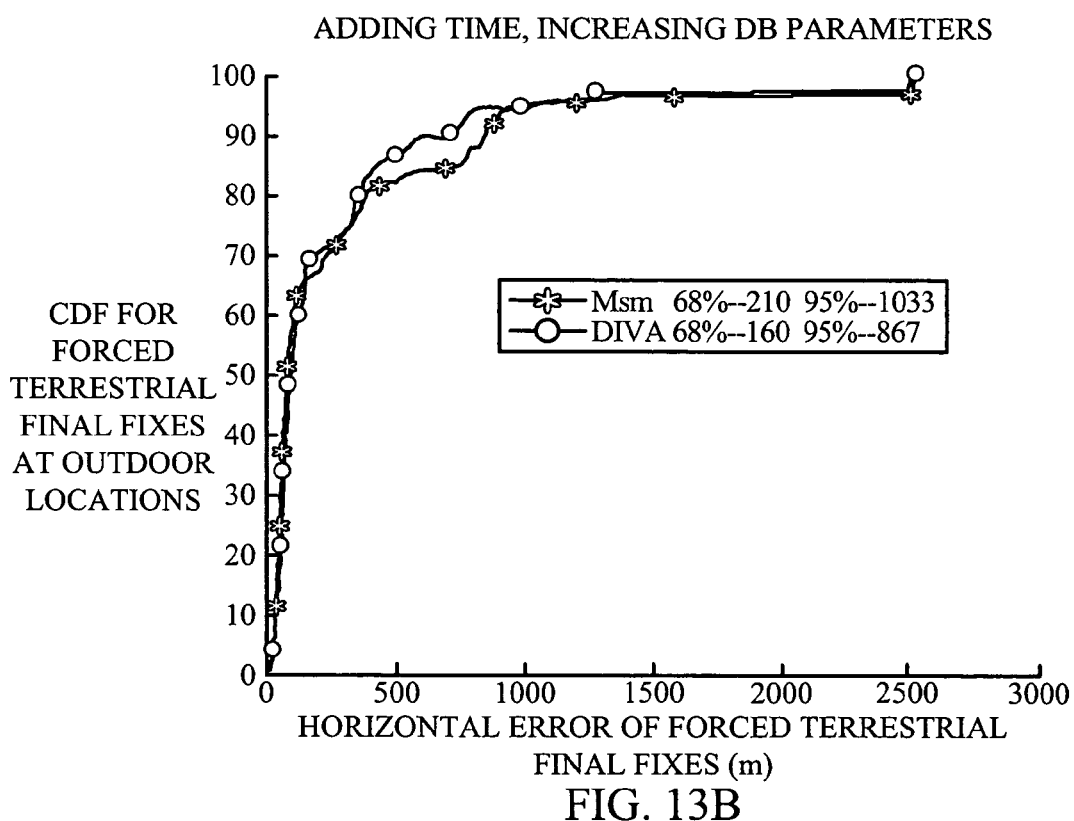
Figure 14A:
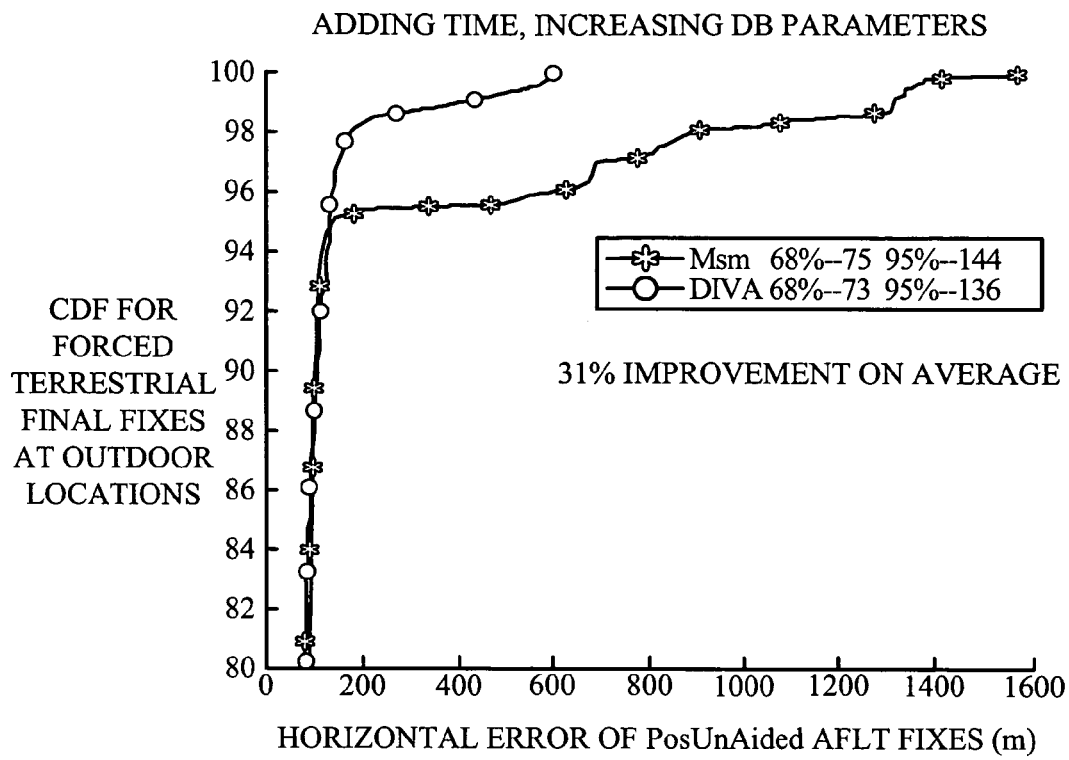
FIG. 14a is a graph of the Cumulative Distribution Function (CDF) at outdoor locations (using two phones) for pure AFLT location determination solutions ("fixes") versus horizontal error.
Figure 14B:
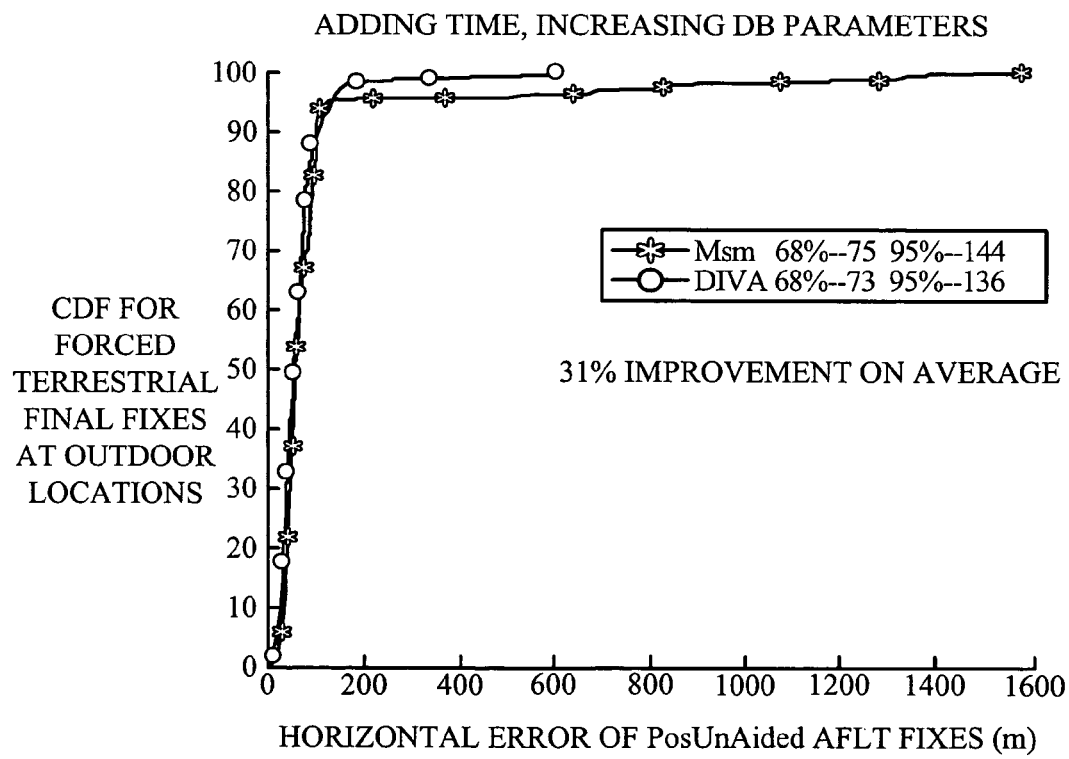

The drive route is shown in FIG. 12. The relative performance of the prototype (labeled DIVA) and the state-of-the-art phone (labeled MSM) for forced terrestrial location determination solutions ("fixes") (no GPS) is shown in FIGS. 13a and 13b. Note that FIG. 13b is simply a "zoomed-out" version of FIG. 13a, showing the 70$^{th}$ percentile and above in the CDF of location accuracy. The results show a 24% improvement at the 68th percentile and 16% at the 95$^{th}$ percentile. The best results are 49% at 97th percentile and 40% at the 85th percentile. Additionally, FIG. 14a is a graph of the Cumulative Distribution Function (CDF) at outdoor locations (using two phones) for pure AFLT location determination solutions ("fixes") versus horizontal error. FIG. 14b is a "zoomed-out" version of FIG. 14a.

Figure 15:
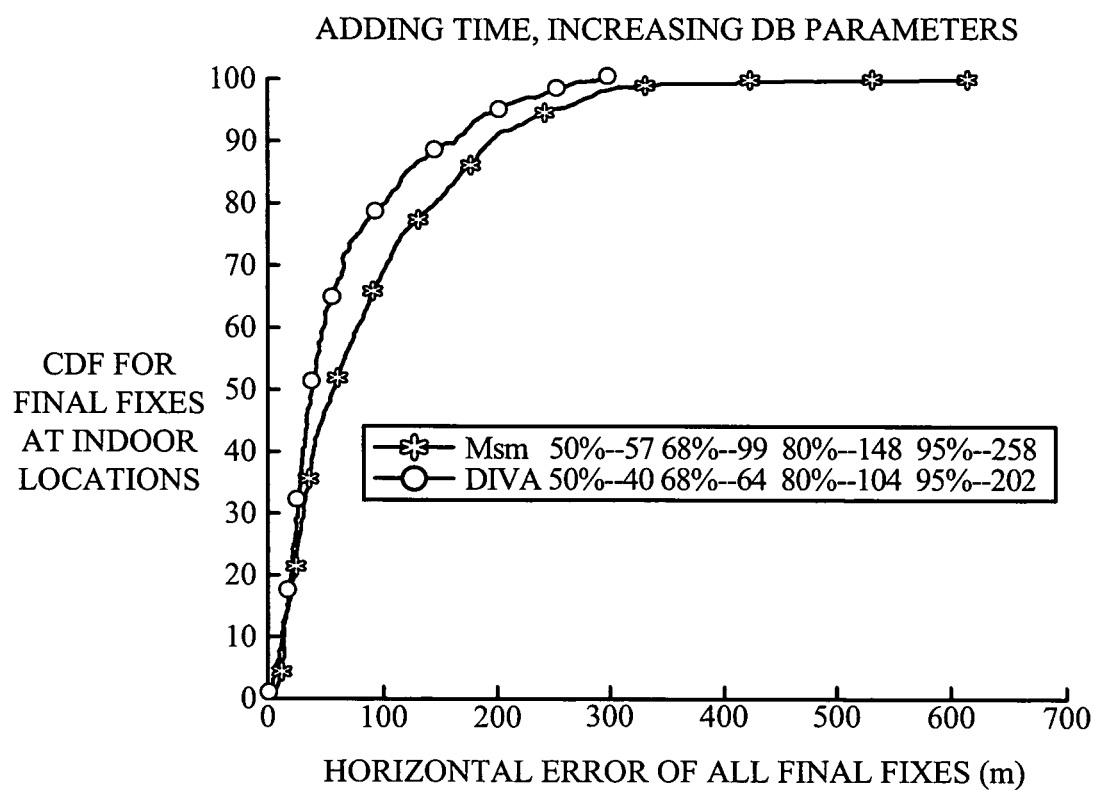
FIG. 15 is a graph of the Cumulative Distribution Function (CDF) at three indoor locations versus horizontal error.

Also, in indoor tests, two phones were tested at indoor locations with poor GPS yields. In the office building, there were three known locations where the GPS yield was less than 40%. The location determination results for the two phones are shown in FIG. 15. In general, above the 40$^{th}$ percentile, there is about 20% or more improvement in location determination when using the prototype compared to the state-of-the-art. The best results are a ~50% at the 100$^{th}$ percentile, as the CDF tail improves from ~600 meters to 300 meters.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention.

Further, many embodiments are described herein in terms of functions to be performed by, for example, elements of a mobile phone (e.g., an antenna, a GPS receiver, transceiver, one or more processors, etc.). It will be recognized that the various functions described herein can be performed by hardware on the phone configured to perform the functions described herein, by program instructions being executed by one or more processors, or by a combination of both.

Figure 16:
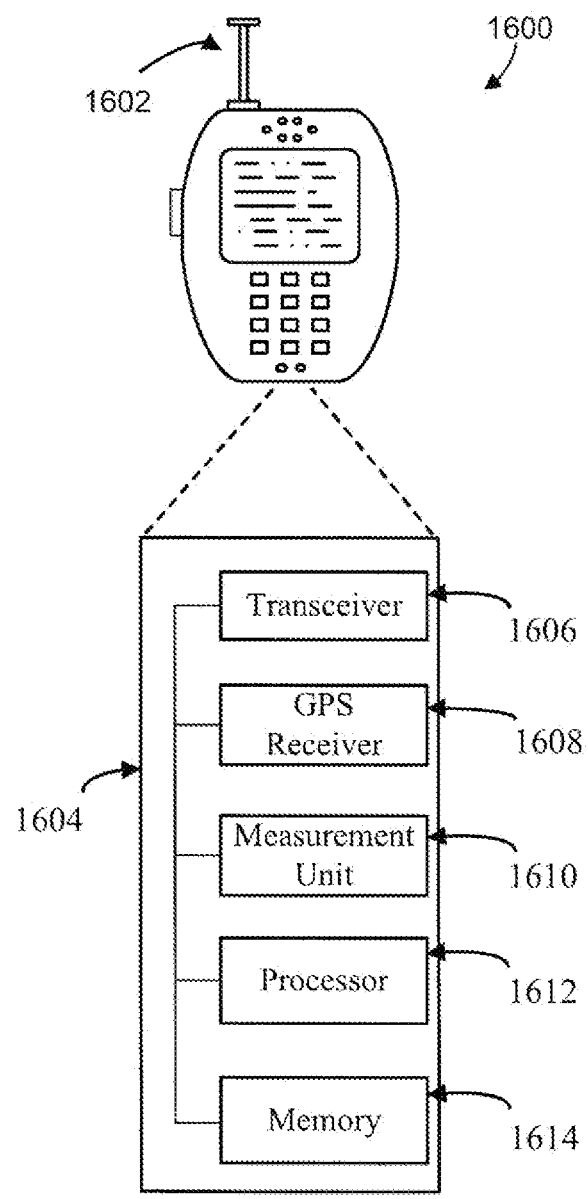
FIG. 16 depicts an exemplary mobile telephone.

FIG. 16 depicts an exemplary mobile telephone 1600. The mobile telephone 1600 includes an antenna 1602, as well as circuitry 1604 that is configured to execute the functions described herein. Circuitry 1604 can include a transceiver 1606, a GPS receiver 1608, a measurement unit 1610, a processor 1612, and a memory 1614. In an example, the mobile phone 1600 can have location determination capability.

The invention claimed is:

1. A method for location determination using a plurality of signal sources, comprising:
   receiving, using an antenna coupled to a wireless device, a plurality of signals from the plurality of signal sources;
   obtaining multiple ranging signal measurements at different time intervals from each signal source in the plurality of signal sources to form a temporal ranging signal measurement set for each signal source in the plurality of signal sources;
   combining the temporal ranging signal measurement sets from each of the signal sources to obtain a single temporal ranging signal measurement set using a temporal measurement metric; and
   calculating a single temporal location determination solution from the single temporal ranging signal measurement set,
   wherein the temporal measurement metric includes calculating a root mean square (RMS) value for each of the temporal ranging signal measurement sets to obtain the single temporal location determination solution.

2. The method of claim 1, wherein the temporal measurement metric includes selecting a path with the smallest time of arrival that is not a false path or a sidelobe.

3. A method for determining a location using a plurality of signal sources, comprising:
   receiving, using an antenna coupled to a wireless device, a plurality of signals from the plurality of signal sources;
   obtaining multiple ranging signal measurements at different time intervals from each signal source in the plurality of signal sources to form a temporal ranging signal measurement set for each signal source in the plurality of signal sources;
   calculating temporal location determination solutions from the temporal ranging signal measurement sets; and
   combining the temporal location determination solutions to obtain a single temporal location determination solution using a temporal location metric,
   wherein the temporal location metric includes calculating a root mean square (RMS) value for each of the temporal location determination solutions to obtain the single temporal location determination solution.

4. The method of claim 3, wherein the temporal location metric includes calculating a root mean square (RMS) value of residual errors associated with each of the temporal location determination solutions.

5. An apparatus for location determination using a plurality of signal sources, comprising:

means for obtaining multiple ranging signal measurements at different time intervals from each signal source in the plurality of signal sources to form a temporal ranging signal measurement set for each signal source in the plurality of signal sources;

means for combining the temporal ranging signal measurement set from each of the signal sources to obtain a single temporal ranging signal measurement set using a temporal measurement metric; and means for calculating a single temporal location determination solution from the single temporal ranging signal measurement set, wherein the temporal measurement metric includes calculating a root mean square (RMS) value for each of the temporal ranging signal measurement sets to obtain the single temporal location determination solution.

6. The apparatus of claim 5, wherein the temporal measurement metric includes selecting a path with the smallest time of arrival that is not a false path or a sidelobe.

7. An apparatus for location determination using a plurality of signal sources, comprising:

means for obtaining multiple ranging signal measurements at different time intervals from each signal source in the plurality of signal sources to form a temporal ranging signal measurement set for each signal source in the plurality of signal sources;

means for calculating temporal location determination solutions from the temporal ranging signal measurement sets; and means for combining the temporal location determination solutions to obtain a single temporal location determination solution using a temporal location metric, wherein the temporal location metric includes calculating a root mean square (RMS) value for each of the temporal location determination solutions to obtain the single temporal location determination solution.

8. The apparatus of claim 7, wherein the temporal location metric includes calculating a root mean square (RMS) value of residual errors associated with each of the temporal location determination solutions.

9. An apparatus for location determination using a plurality of signal sources, comprising:

a measurement unit that obtains multiple ranging signal measurements at different time intervals from each signal source in the plurality of signal sources to form a temporal ranging signal measurement set for each signal source in the plurality of signal sources and combines the temporal ranging signal measurement sets from each of the signal sources to obtain a single temporal ranging signal measurement set using a temporal measurement metric; and a processing unit that calculates a single temporal location determination solution from the single temporal ranging signal measurement set, wherein the temporal measurement includes calculating a root mean square (RMS) value for each of the temporal ranging signal measurement sets to obtain the single temporal location determination solution.

10. The apparatus of claim 9, wherein the temporal measurement metric includes selecting a path with the smallest time of arrival that is not a false path or a sidelobe.

11. An apparatus for location determination using a plurality of signal sources, comprising:

a measurement unit that obtains multiple ranging signal measurements at different time intervals from each signal source in the plurality of signal sources to form a temporal ranging signal measurement set for each signal source in the plurality of signal sources; and a processing unit that calculates temporal location determination solutions from the temporal ranging signal measurement sets and combines the temporal location determination solutions to obtain a single temporal location determination solution using a temporal location metric, wherein the temporal location metric includes calculating a root mean square (RMS) value for each of the temporal location determination solutions to obtain the single temporal location determination solution.

12. The apparatus of claim 11, wherein the temporal location metric includes calculating a root mean square (RMS) value of residual errors associated with each of the temporal location determination solutions.

13. A computer readable medium comprising instructions that, when read and executed by a processor, cause the processor to perform location determination using a plurality of signal sources, the instructions comprising:

instructions for receiving, using an antenna coupled to a wireless device, a plurality of signals from the plurality of signal sources;

instructions for obtaining multiple ranging signal measurements at different time intervals from each signal source in the plurality of signal sources to form a temporal ranging signal measurement set for each signal source in the plurality of signal sources;

instructions for combining the temporal ranging signal measurement sets from each of the signal sources to obtain a single temporal ranging signal measurement set using a temporal measurement metric; and instructions for calculating a single temporal location determination solution from the single temporal ranging signal measurement set, wherein the temporal measurement metric includes calculating a root mean square (RMS) value for each of the temporal ranging signal measurement sets to obtain the single temporal location determination solution.

14. The computer readable medium of claim 13 wherein the temporal measurement metric includes selecting a path with the smallest time of arrival that is not a false path or a sidelobe.

15. A computer readable medium comprising instructions that, when read and executed by a processor, cause the processor to perform location determination using a plurality of signal sources, the instructions, comprising:

instructions for receiving, using an antenna coupled to a wireless device, a plurality of signals from the plurality of signal sources;

instructions for obtaining multiple ranging signal measurements at different time intervals from each signal source in the plurality of signal sources to form a temporal ranging signal measurement set for each signal source in the plurality of signal sources;

instructions for calculating temporal location determination solutions from the temporal ranging signal measurement sets; and instructions for combining the temporal location determination solutions to obtain a single temporal location determination solution using a temporal location metric, wherein the temporal location metric includes calculating a root mean square (RMS) value for each of the temporal location determination solutions to obtain the single temporal location determination solution.

16. The computer readable medium of claim 15, wherein the temporal location metric includes calculating a root mean square (RMS) value of residual errors associated with each of the temporal location determination solutions.

* * * * *